(12) United States Patent
Upton

(10) Patent No.: US 6,925,260 B1
(45) Date of Patent: Aug. 2, 2005

(54) WINDOW-MOUNTED POSITIONABLE COLLECTOR

(75) Inventor: Eric Lawrence Upton, Bellevue, WA (US)

(73) Assignee: Terabeam Corporation, Falls Church, VA (US)

( * ) Notice: Subject to any disclaimer, the term of this patent is extended or adjusted under 35 U.S.C. 154(b) by 627 days.

(21) Appl. No.: 09/805,656

(22) Filed: Mar. 13, 2001

(51) Int. Cl.$^7$ .............................................. H04B 10/00
(52) U.S. Cl. ........................ 398/121; 398/118; 398/128
(58) Field of Search ................................ 398/128, 129, 398/130, 131, 117, 122, 121, 124, 125

(56) References Cited

U.S. PATENT DOCUMENTS

| | | | | | |
|---|---|---|---|---|---|
| 5,229,593 | A | * | 7/1993 | Cato ........................... | 250/205 |
| 5,530,577 | A | * | 6/1996 | Orino et al. ................. | 398/129 |
| 5,710,652 | A | * | 1/1998 | Bloom et al. ................ | 398/129 |
| 6,069,909 | A | * | 5/2000 | Miller ......................... | 372/103 |
| 6,104,513 | A | * | 8/2000 | Bloom ........................ | 398/117 |
| 6,175,451 | B1 | * | 1/2001 | Iriyama et al. .............. | 359/627 |
| 6,268,944 | B1 | * | 7/2001 | Szapiel ....................... | 398/129 |
| 6,285,476 | B1 | * | 9/2001 | Carlson et al. .............. | 398/9 |
| 6,323,980 | B1 | * | 11/2001 | Bloom ........................ | 398/129 |
| 6,348,986 | B1 | * | 2/2002 | Doucet et al. .............. | 398/128 |
| 6,539,138 | B2 | * | 3/2003 | Holmes ....................... | 385/16 |

* cited by examiner

Primary Examiner—M. R. Sedighian
Assistant Examiner—Dalzid Singh
(74) Attorney, Agent, or Firm—Blakely Sokoloff Taylor & Zafman LLP

(57) ABSTRACT

A window-mounted positionable collector comprising a base that is secured to a window. An inner rotatable hollow wedge-cut member may be rotated about the base to produce a first degree of freedom, while an outer rotatable hollow wedge-cut member may be rotated about a top end of the inner rotatable hollow wedge-cut member to provide a second degree a freedom. The combination of the first and second degrees of freedom enables the optical axis of an optical collector operatively coupled to the outer rotatable hollow wedge-cut member to be directed along any direction falling within a cone of angulation defined by acute angles corresponding to the angles of the wedge cuts defined in the rotatable hollow wedge cut members. In one embodiment, a cover is connected to a top end of the outer rotatable hollow wedge-cut member to form a sealed volume, whereby the apparatus may be secured to the window by applying a vacuum to the sealed volume.

24 Claims, 8 Drawing Sheets

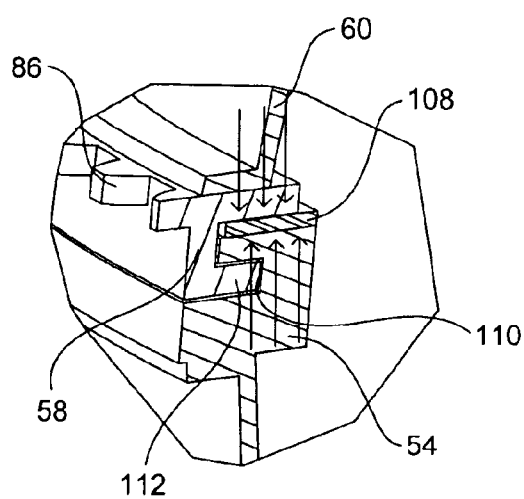 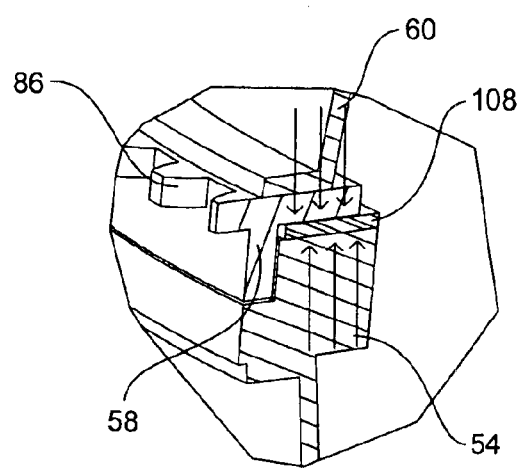
*FIG. 5A*  *FIG. 5B*

US 6,925,260 B1

WINDOW-MOUNTED POSITIONABLE COLLECTOR

BACKGROUND OF THE INVENTION

1. Field of the Invention

The present invention relates generally to optical systems and, more specifically, to an apparatus for positioning optical components, such as those used in optical communications systems.

2. Background Information

With the increasing popularity of wide area networks (WANs), such as the Internet and/or the World Wide Web, network growth and traffic has exploded in recent years. Network users continue to demand faster networks and more access for both businesses and consumers. As network demands continue to increase, existing network infrastructures and technologies are reaching their limits.

An alternative to present day hardwired or fiber network solutions is the use of wireless optical communications. Wireless optical communications utilize point-to-point communications through free space and therefore do not require the routing of cables or fibers between locations. Thus, wireless optical communications are also known as free space or atmospheric optical communications. For instance, in a free space optical communication system, a beam of light is directed through free space from a transmitter at a first location to a receiver at a second location. Data or information is encoded into the beam of light, and therefore, the information is transmitted through free space from the inner location to the second location.

An important aspect of a free space optical communications system is tracking. In particular, it is important that the optical communications beam (e.g., laser beam) is aimed properly from the transmitter at the first location and that the receiver at the second location is aligned properly to receive the optical communications beam. For example, assume that a transmitter is mounted on a first building and that a receiver is mounted on a different second building. Assume further that there is a line of sight between the transmitter and receiver. It is important for the transmitter on the first building to be configured to accurately direct or aim the optical communications beam at the receiver on the second building.

One difficult aspect of utilizing free space optical communication systems is the initial alignment of the transmitter and receiver. In many instances, the transmitters and receivers will each comprise a single transceiver apparatus. In order to determine if the transceivers are properly aligned, it will generally be necessary to provide a feedback signal to each of the transceivers. However, if the feedback signal is to be provided via an optical path (which is typically the case), the transceivers must be at least partially aligned. This has been shown in practice to require a significant amount of time and resources.

SUMMARY OF THE INVENTION

The present invention provides a window-mounted positionable collector that enables easy alignment of free-space optical communications system transceivers. The apparatus comprises a base that is secured to a window. An inner rotatable hollow wedge-cut member may be rotated about the base to produce a first degree of freedom, while an outer rotatable hollow wedge-cut member may be rotated about a top end of the inner rotatable hollow wedge-cut member to provide a second degree a freedom. The combination of the first and second degrees of freedom enables the optical axis of an optical collector operatively coupled to the outer rototable hollow wedge-cut member to be directed along any direction falling within a cone of angulation defined by acute angles corresponding to angles of the wedge cuts defined in the rotatable hollow wedge cut members.

According to one embodiment, the base is mounted to the window using a vacuum that is applied to a sealed volume comprising the inner and outer rotatable hollow wedge-cut members and a cover that extends over a top end of the outer rotatable hollow wedge-cut member. The cover includes an air-tight optical aperture through which light can be pass, thereby enabling an optical device that is coupled to the cover to receive and/or transmit light through the optical aperture. In one embodiment, the optical aperture is disposed in a tube extending through the cover. During an alignment process, a telescope is mounted within the tube and is used by a user to assist the user in positioning the apparatus such that direction of the optical collector's optical axis is aligned with a desired target.

According to other aspects of the invention, the optical collector comprises a Cassegrain collector including a primary and secondary reflector is mounted within the sealed volume and operatively coupled to the outer rotatable hollow wedge-cut member. The primary reflector receives an incoming light signal and reflects it toward the secondary reflector, which in turn reflects the light signal towards a detecting component that is located in proximity to the focal point of the secondary reflector. In addition, a tube disposed within the secondary reflector containing a lens is provided to collimate an outgoing optical signal, thereby enabling the apparatus to function as a transceiver.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 5A shows a local cross section illustrating the interface between the inner and outer rotatable hollow wedge cut members, wherein the interface includes an overlapping tang that enables the members to be held together prior to applying a vacuum.

FIG. 5B shows a local cross section illustrating the interface between the inner and outer rotatable hollow wedge cut members, wherein the interface does not include an overlapping tang, and the members are held together via a vacuum;

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

In one example embodiment of the present invention, point-to-point free space optical communications are provided from a transmitter to a receiver. The transmitter and receiver may be located at the same location or at different locations such as on different buildings within a line of sight of each other. In one embodiment, the line of sight may include reflections off one or more reflective surfaces between the transmitter and receiver in accordance with the teachings of the present invention. It is appreciated that the transmitter and the receiver may be parts of transceivers, or transmitter-receiver combinations, at their respective locations, such that bi-directional communications are provided. In the example embodiment, the transmitter includes an optical source that generates an optical communications beam, such as a laser beam or the like, on which data or information is modulated. The optical communications beam is not limited to being monochromatic or to any particular wavelength or color and may include the visible light as well as ultra violet or infra-red portions of the spectrum.

Figure 1A:
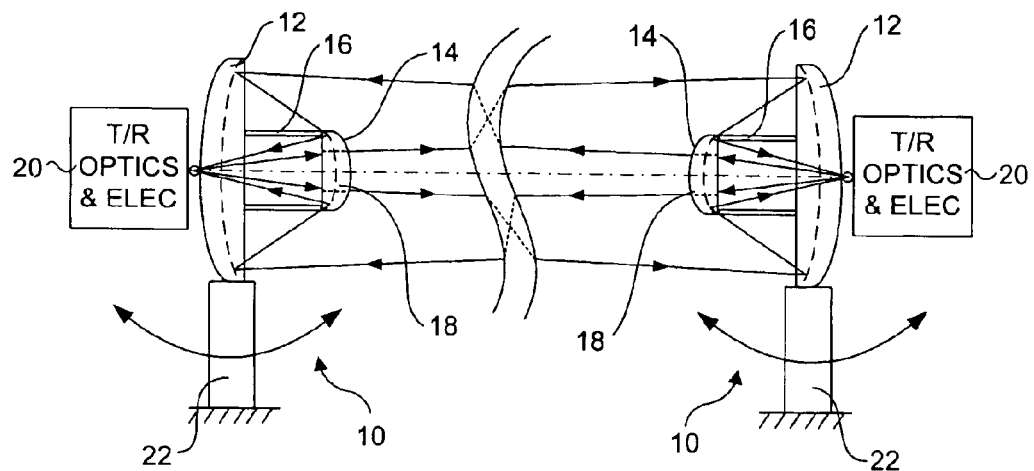
FIG. 1A is an illustration of a convention optical communications system that uses Cassegrain collectors comprising on-axis primary and secondary reflectors and provides transmitting and receiving capabilities at a pair of transceiver stations disposed at remote locations.
Figure 1B:
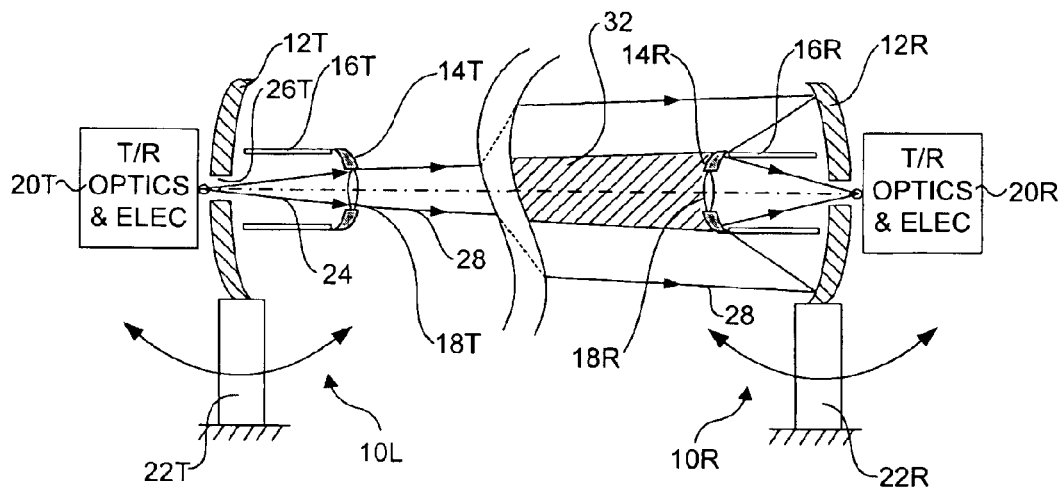
FIG. 1B shows how an optical signal is transmitted by a first transceiver station and received by a second transceiver station, and illustrates the path of the light signals transmitted between the transceiver stations.

A conventional free space optical system is shown in FIGS. 1A and 1B. The free space optical system includes a pair of transceiver stations 10 that are typically located on or in separate building or towers. Each transceiver station 10 includes a primary collector 12 to which a secondary mirror 14 is coupled via a plurality of rigid struts 16. The transceiver stations further include a transmitted signal lens 18 mounted within secondary mirror 14, and a set of transmitter/receiver optics and electronics 20. All of components 12, 14, 16, 18, and 20 are operatively coupled to a yoke that is connected to a base 22 via a gimble assembly, such that these components are all moved in response to a gimbled movement of the yoke relative to a static surface on which the base 22 is placed.

With reference to FIG. 1B, data is transmitted from a transceiver station 10L to a transceiver station 10R in the following manner. An optical signal 24 is generated by transmitter/receiver optics and electronics 20T of transceiver station 10T and directed through an opening 26T defined in primary collector 12T towards transmitted signal lens 18T, which produces a collimated signal 28. As collimated signal 28 moves toward transceiver station 10R, the width of the signal diverges very gradually. As will be recognized by those skilled in the art, the divergence of the various optical signals depicted in the Figures contained herein are exaggerated for clarity. Upon reaching transceiver station 10R, the outer portions of collimated signal 28 impinge upon primary collector 12R, which comprises a concave mirrored surface that redirects those portions of the signal that impinge upon it toward secondary mirror 14R. Collimated signal 28 is then reflected by secondary mirror 14R towards the secondary mirror's focal point 30, where it is received by transmitter/receiver optics and electronics 20R.

In order to establish communication between a pair of transceiver stations, it is necessary that the outgoing beams from each of the transceivers be received by the other transceiver. In practice, it is difficult to properly align the transceivers. The actual widths of the transmitted beams (i.e., collimated signals 28) are relatively small. Furthermore, a central portion 32 of collimated signal 28 is obscured by secondary mirror 14 and transmitted signal optics 18, making a significant portion of the optical signal is made unusable. Another disadvantage of this configuration is that the entire optical assembly (i.e., components, 12, 14, 16, 18, and 20) must be rotated by gimbled base 22 to account to perform the alignment and to account for environmental disturbances during communication operations, such as building sway.

In one conventional configuration, each transceiver 22 is mounted to a floor of a windowed room within respective buildings, wherein the communication path between the transceivers includes passage of light through respective exterior windows corresponding to each of the windowed rooms. This leads to several problems, including having to account for vibrations in the floors of the rooms. Preferably, it would be desired to be able to mount the transceivers directly to the windows.

Figure 2A:
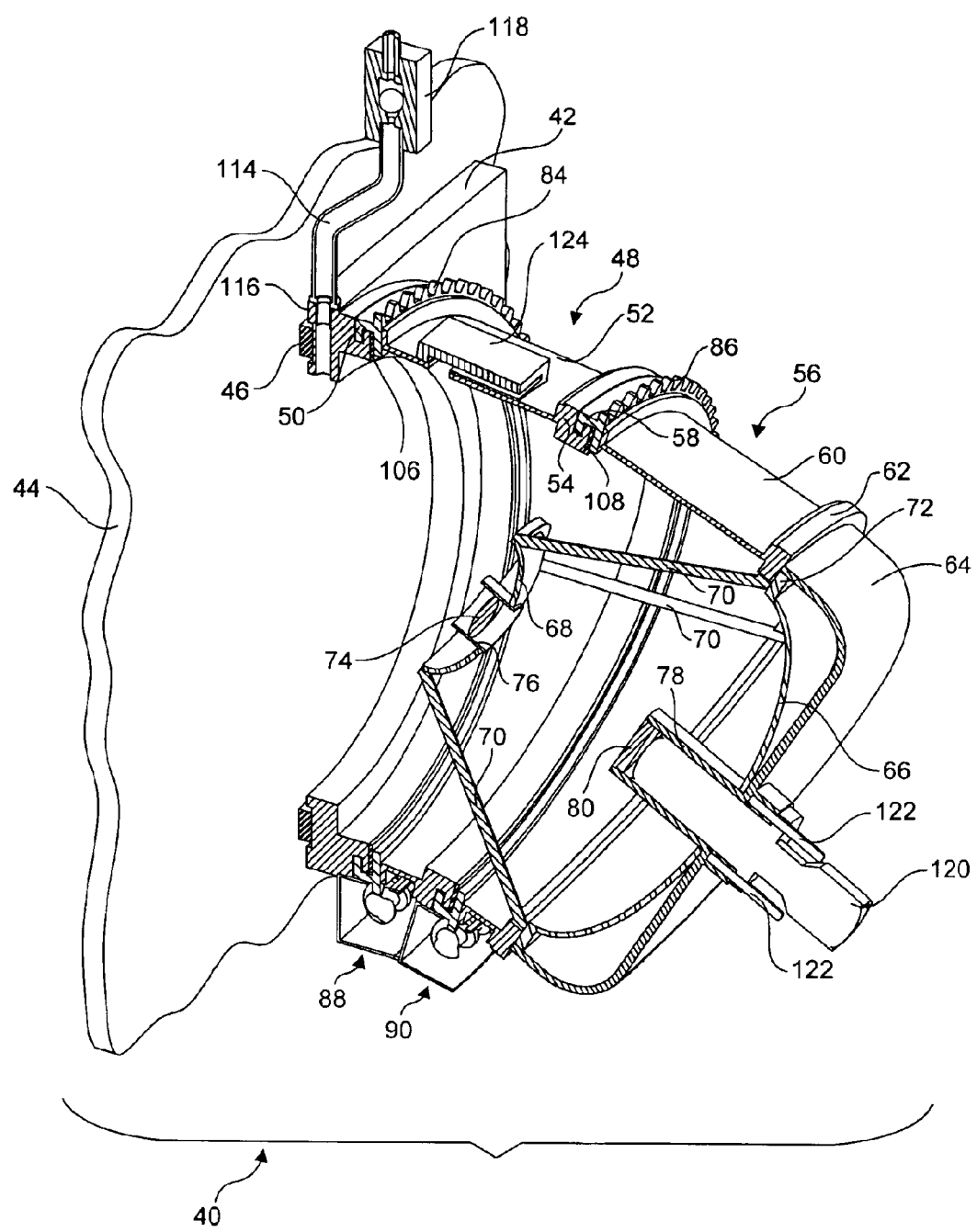
FIG. 2A is a cut-away view of an embodiment of the present invention is which the positionable collector apparatus is mounted to a window using a vacuum and an optical axis of the apparatus is aligned the use of a telescope.

The present invention facilitates this functionality by providing a window-mounted collector that enables the direction of outgoing optical beams to be easily controlled. A cut-away view of an exemplary configuration of a window mounted positionable collector 40 in accord with the invention is shown in FIG. 2A. Window mounted positionable collector 40 includes a base 42 mounted to a window 44. In one embodiment, base 42 is secured to window 44 by means of an adhesive. In an alternative embodiment, base 42 is secured to window 44 using vacuum, wherein a gasket 46 is used to form a seal between base 42 and window 44.

An inner rotatable hollow wedge-cut member 48 is rotatably coupled to base 42. Inner rotatable hollow wedge-cut member 48 includes a base end 50 coupled to a hollow wedge-cut tube 52, which in turn is coupled to a top end 54. An outer rotatable hollow wedge-cut member 56 is rotatably coupled to top end 54 at a base end 58. The sidewall portion of outer rotatable hollow wedge-cut member 56 comprises a hollow wedge-cut tube 60 that is coupled at one end to base end 58 and at the other end to a top end 62. The positionable collector further includes a cover 64 coupled to top end 62.

Figure 3:
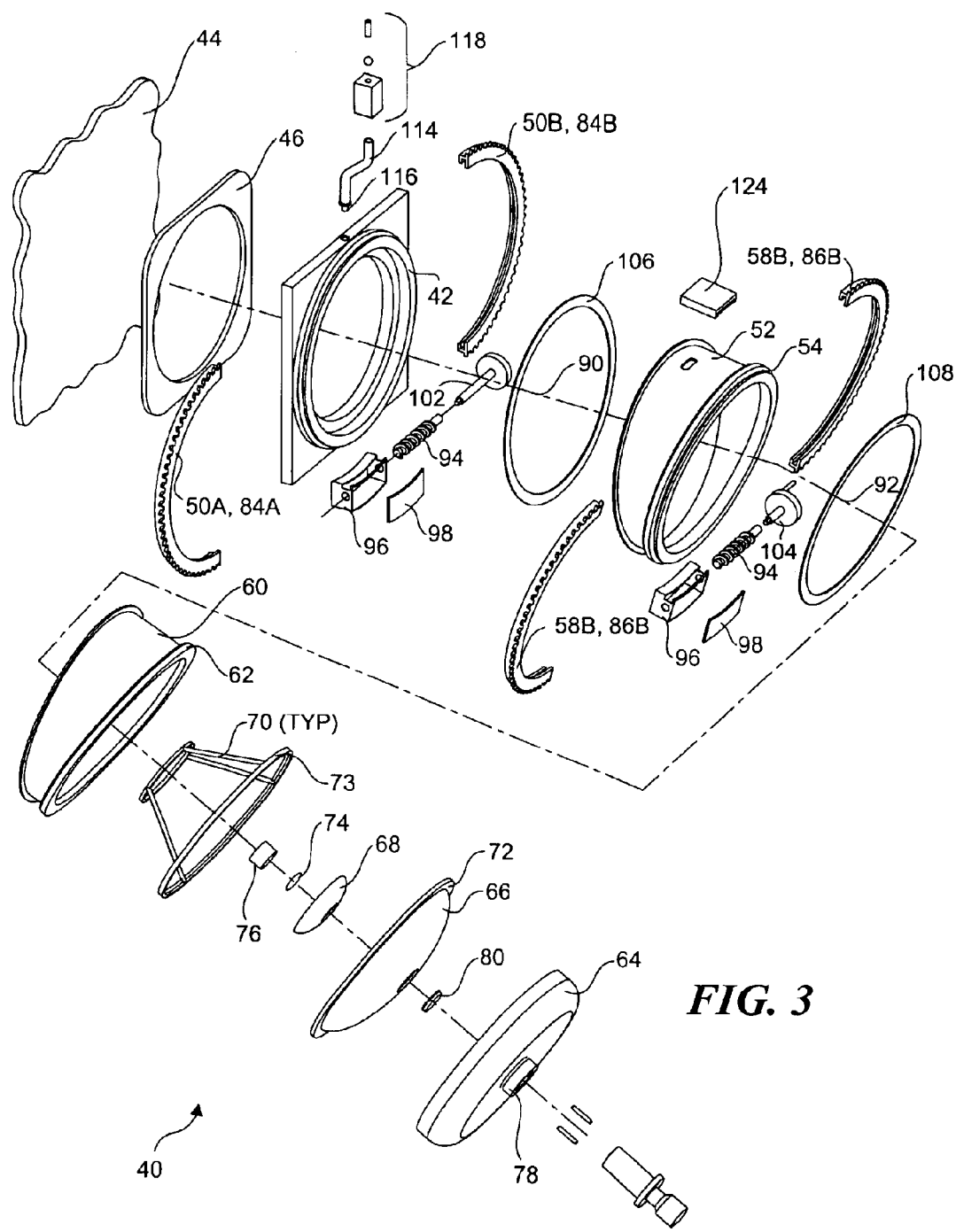
FIG. 3 comprises an exploded view illustrating the primary components of the embodiment shown in FIGS. 2A and 2B.
Figure 4:
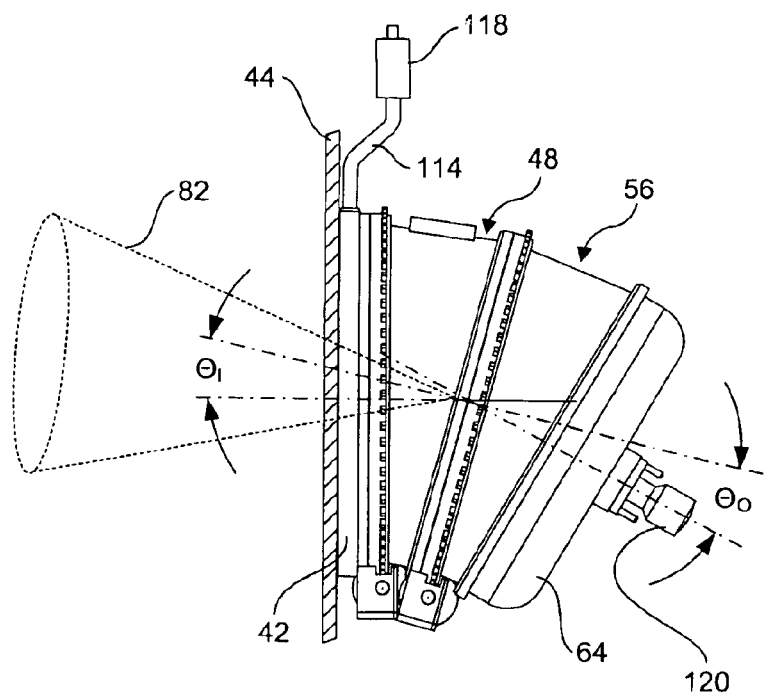
FIG. 4 is an elevational view illustrating a cone of angulation corresponding to a loci of positions that may be obtained through use of the apparatus of FIGS. 2A and 2B.
Figure 6E:
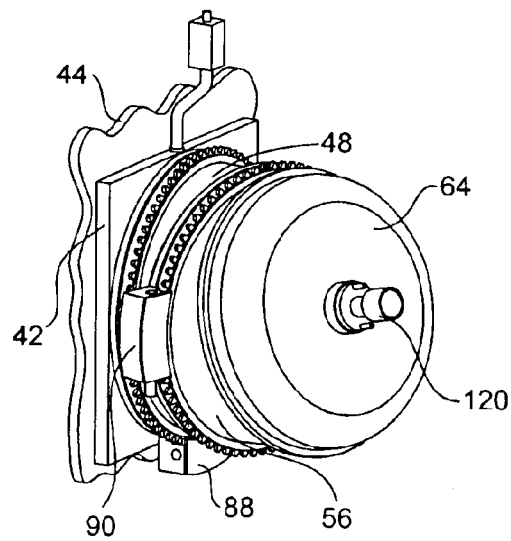
FIGS. 6A–F illustrate various configurations of the embodiment of FIGS. 2A and 2B, wherein the configurations of obtained by rotating the inner and outer rotatable hollow wedge cut members to various positions.
Figure 6F:
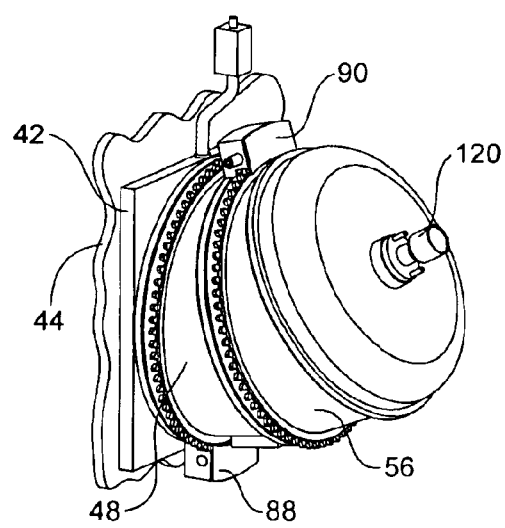
Figure 6A:
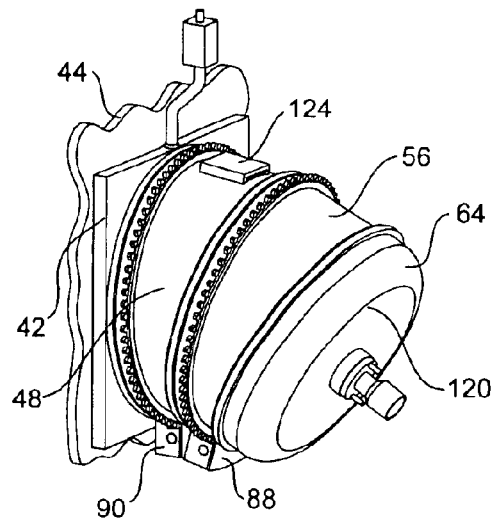
Figure 6B:
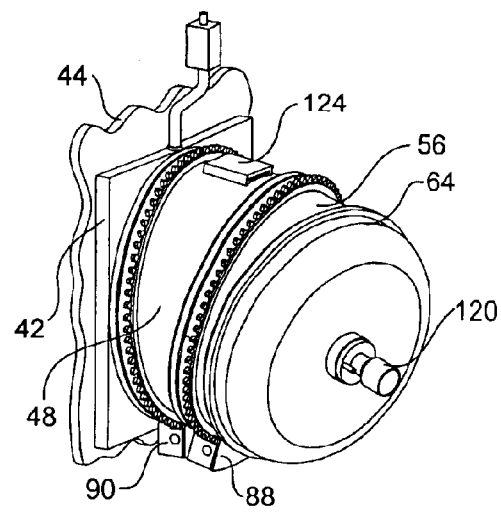
Figure 6C:
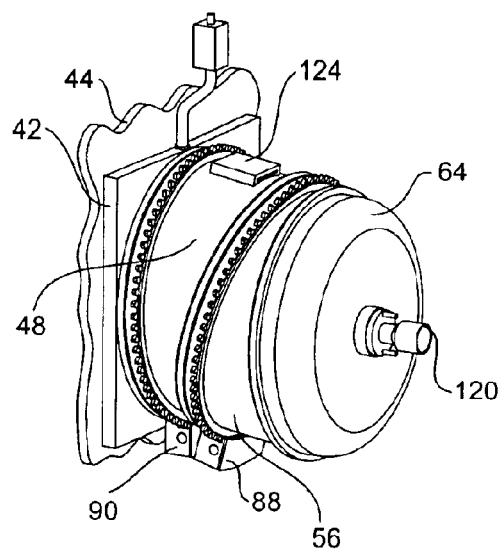
Figure 6D:
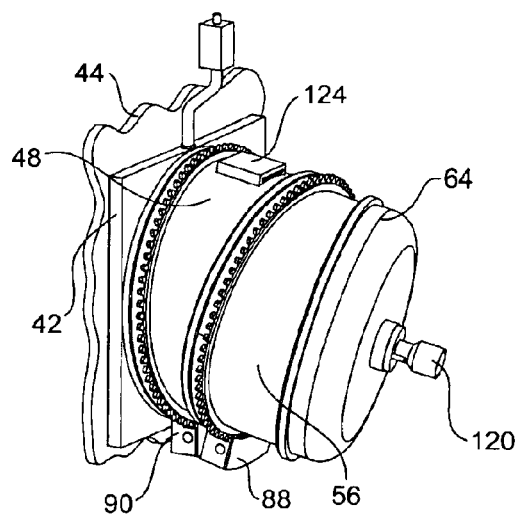

In one embodiment, window mounted positionable collector 40 is used to position a Cassegrain collector comprising a primary reflector 66 coupled to a secondary reflector 68 by means of a plurality of struts 70. In general, the components of the Cassegrain collector will be secured to outer rotatable hollow wedge-cut member 52 by means of a support 73 that maintains the position of primary reflector 66 and/or secondary reflector 68 relative to the wedge-cut member, as shown in FIG. 3. In one embodiment, support 73 includes a support ring 72 that is coupled to an outer diameter of primary reflector 66 (or integrally formed therewith) and is mounted to top end 62.

Window mounted positionable collector 40 also provides for signals to be transmitted outward through window 44. Accordingly, the apparatus further includes a lens 74 mounted in a tube 76 disposed in a center portion of secondary reflector 68. In configurations in which a vacuum is used to secure the apparatus to window 44, a tube 78 including an air-tight optical aperture 80, is disposed in a center portion of primary reflector 66. Preferably, optical aperture 80 will comprise an optically clear material that enables light beams to pass through it with substantially no loss of signal strength. Generally, the shape of optical aperture 80 will comprise a flat plate such that light passing the through the aperture is not redirected. However, optical aperture 80 may also comprise a lens shape, depending on the optical components in the configuration.

With reference to FIG. 3, each of inner and outer rotatable hollow wedge-cut members 48 and 56 are configured such that centerlines perpendicular to their respective top ends 54 and 62 are orientated at an acute angle with respect to centerlines that are perpendicular to their base ends 50 and 58, as depicted by angles $\Theta_I$ and $\Theta_O$. As a result of these "wedge-cut" configurations, by rotating inner rotatable hollow wedge-cut member 48 about base 42 and rotating outer rotatable hollow wedge-cut member 56 about top end 54, light passing through transmitted signal lens 74 may be directed anywhere within a cone of angulation 82, which will be a function of angles $\Theta_I$ and $\Theta_O$. Similarly, these rotations will also enable the optical components of the Cassegrain collector to be positioned so as to maximize reception of an incoming light signal.

The inner and outer rotatable hollow wedge-cut members can be rotated relative to their counterpart base components using one of several positioning mechanisms that are well-known to those skilled in the mechanical arts. For example, as illustrated in FIG. 2A, the rotation of these components may be accomplished by means of ring gears 84 and 86 and gear boxes 88 and 90. Gear boxes 88 and 90 are mounted to respective base components at the rotational interfaces (i.e. base 42 and top end 54) such that rotational input to the gear boxes will cause ring gears 84 and 86 to be rotated relative to their respective centerlines 90 and 92. In one embodiment, gear boxes 88 and 90 comprise worm gears 94 mounted within housing components 96 and 98. Preferably, an end 100 of worm gears 94 will be adapted to receive a driven input provided through rotation of cranks 102 and 104. The driven input may be manually provided, or provided by motors through appropriate couplings (not shown).

In optional configurations, gear boxes 88 and 90 may comprises spur gear drives, wherein a spur gear rather than a worm gear engages the teeth of ring gears 84 and 86 to rotate the ring gears. In another configuration, a friction drive may be used (not shown), wherein a friction wheel is used to cause hollow wedge-cut tubes 52 and 60 to be rotated relative to base 42 and top end 54, respectively. In another configuration, ring gears 84 and 86 may comprise slots driven by appropriately-shaped cogs in a manner similar to the spur-gear driven configuration discussed above.

As discussed above, in one embodiment window mounted positionable collector 40 is secured to window 44 by a vacuum. In this configuration, a sealing ring 106 is disposed between base end 50 and base 42, and a sealing ring 108 is disposed between base end 58 and top end 54. With reference to FIG. 5A, in one configuration top end 54 includes a slot 110 in which a tang 112 extending from base end 86 is disposed, thereby forming an interlock between top end 54 and base end 86. The interlock enables a secured attachment of outer rotatable hollow wedge-cut member 56 to inner rotatable hollow wedge-cut member 48, and, similarly, inner rotatable hollow wedge-cut member 48 to base 42. In order to facilitate this interlocking configuration, base ends 50 and 58 should be split, as depicted in FIG. 3 by base end halves 50A and 50B, and 58A and 58B. Also shown in FIG. 3 is a configuration wherein the base ends are integrally formed with respective split ring gears, which are labeled 84A and 84B, and 86A and 86B.

An alternative configuration is illustrated in FIG. 5B, wherein there is no interlock between top end 54 and base end 58. In this instance, the components are held together by a vacuum, as described below. In general, it will be preferably that these components be held together by other means prior to applying the vacuum. For example, the components may be end together by removable external clamps or screws (both not shown). Once a vacuum is applied, the external clamps or screws can be removed.

The vacuum mounted configuration works as follows. A vacuum pump (not shown) connected to a vacuum line 114 is activated to draw air outside of a sealed volume formed by inner and outer rotatable hollow wedge-cut members 48 and 56 and cover 64. As depicted in FIG. 2A, vacuum line 114 is connected via a port 116 connected to base 42. Preferably, vacuum line 114 will include a check valve 118 that enables gas to be evacuated from the sealed volume, but prevents gas from entering the sealed volume when the vacuum pump is removed or deactivated. As air is removed from the sealed volume, substantially flat portions 120 and 122 of top end 54 and base end 58, respectively, are caused to be forced together so as to squeeze sealing ring 108, thereby forming a seal between inner and outer rotatable hollow wedge-cut members 48 and 56. A similar effect causes sealing ring 106 to be squeezed, creating seal between base 42 and base end 50. Once the pressure differential between the external atmosphere and the sealed volume is large enough, base 42 will be able to be secured to window 44 via gasket 46.

Once the components are secured via the vacuum in the sealed volume, the optical alignment process may begin. In one implementation of the alignment process, a telescope 120 is inserted into tube 78 and is coupled to the tube via a pair of dowel pins 122. The depending on the focus setting of telescope 120, a user may view light received by lens 74 or light received by primary reflector 66. The user then adjusts the rotational positions of inner and outer rotatable hollow wedge-cut members 48 and 56 by rotating cranks 102 and 104. This enables the telescope to be directed toward any direction within cone of angulation 82, as depicted by FIGS. 6A–6F. By using telescope 120, the user can determine the direction of the optical axis of the Cassegrain collector such that it lines up with a desired target (e.g., another transceiver located in a remote building).

Preferably, in order to better enable the components to rotate relative to one another, a lubricant should be applied to the exterior surface of sealing rings 108 and 110. In one implementation, it is desired to lower the pressure in the interior volume to a level that enables the components to be held together via the vacuum, perform the positioning of the inner and outer rotatable hollow wedge-cut members, and then apply an additional vacuum until a desired vacuum level is reached in the sealed volume.

Once the desired vacuum level has been reached, there generally will be very little losses at sealing rings 106 and 108 and gasket 46. However, to support long-term mounting and operation, it will generally be preferable to account for such losses. Accordingly, window mounted positionable collector 40 includes a very-low volume vacuum pump to maintain an adequate vacuum level for signification durations. Ideally, such a vacuum pump should be extremely reliable and produce virtually no vibrations.

In one embodiment, a solid-state piezoelectric vacuum pump 124 is mounted on wedge-cut tube 52, as shown in FIG. 2A. One vacuum pump suitable for this purpose is describe in co-pending application Ser. No. 09/805,654 entitled "PIEZOELECTRIC VACUUM PUMP AND METHOD", filed Mar. 13, 2001, and now U.S. Pat. No. 6,450,773, the specification and drawings of which are herein incorporated by reference. Vacuum pump 124 uses a plurality of piezoelectric bi-morph elements to generate a "wave-like" action that results in a very-low flow rate. Since the pumping action is produced by applying voltages across the piezoelectric bi-morph elements, there is substantially no vibration caused by the pump, and virtually no parts to wear out. As a result, vacuum pump 124 can be operated on a continual basis, and is highly reliable.

Figure 2B:
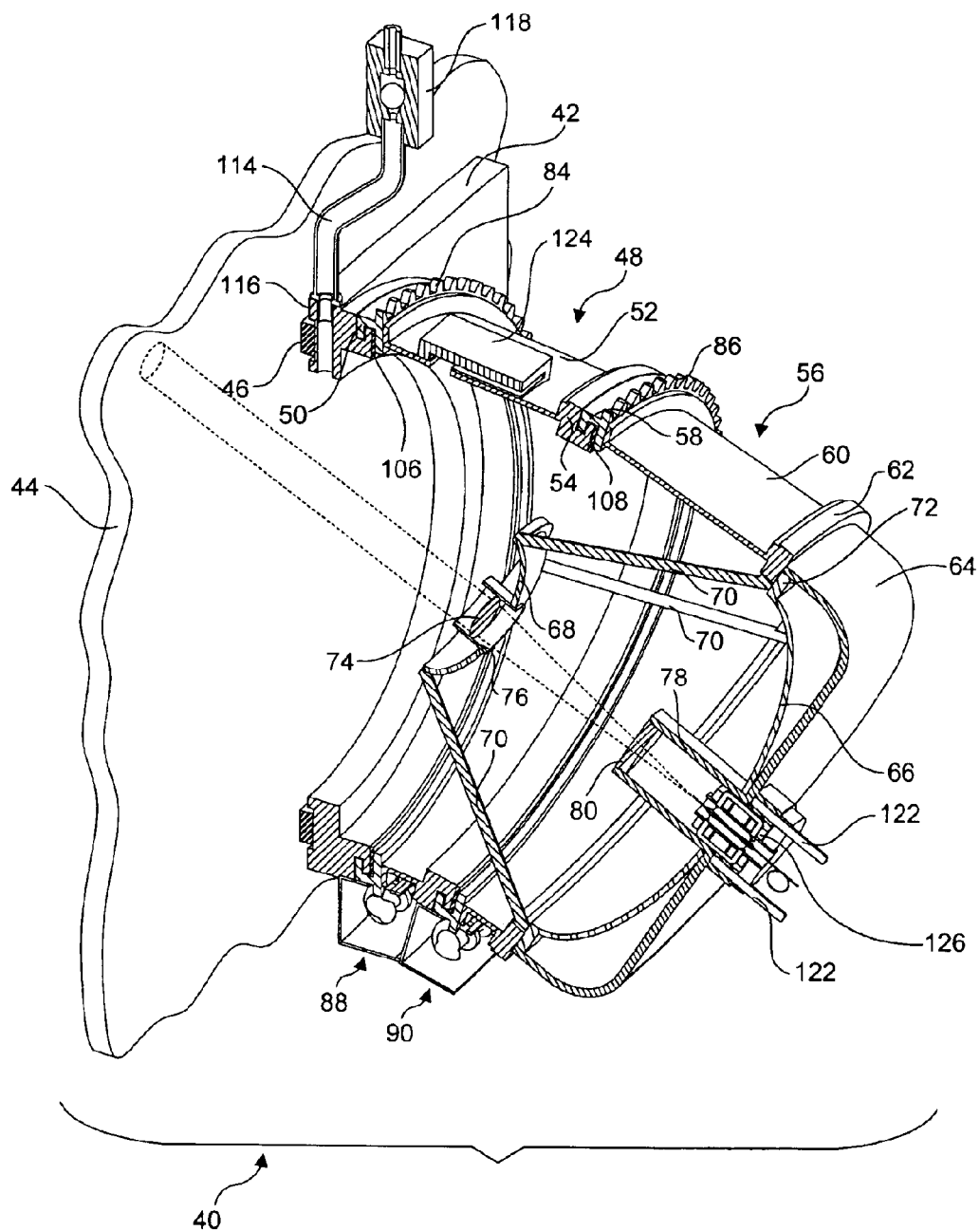
FIG. 2B is a configuration of the apparatus of FIG. 2A in which the telescope has been replaced with a magnetic fluid based fiber optic positioner.

As shown in FIG. 2B, once a desired optical alignment is established, telescope 120 may be replaced with a magnetic fluid based fiber optic positioner 126. Details of the construction and operation of magnetic fluid based fiber optic positioner 126 are contained in application Ser. No. 09/805, 763, entitled "MAGNETIC FLUID-BASED POSITIONING APPARATUS AND METHOD," filed on Mar. 13, 2001, and now U.S. Pat. No. 6,553,161, the specification and drawing figures of which are incorporated herein by reference. As described in the co-pending application, magnetic fluid based fiber optic positioner 126 provides a mechanism for controlling the position of an end portion of a fiber optic cable that is used to emit and/or receive light signals. The positioner also provides a means for controlling the direction of light beams emitted from the end of the fiber optic cable.

Figure 7:
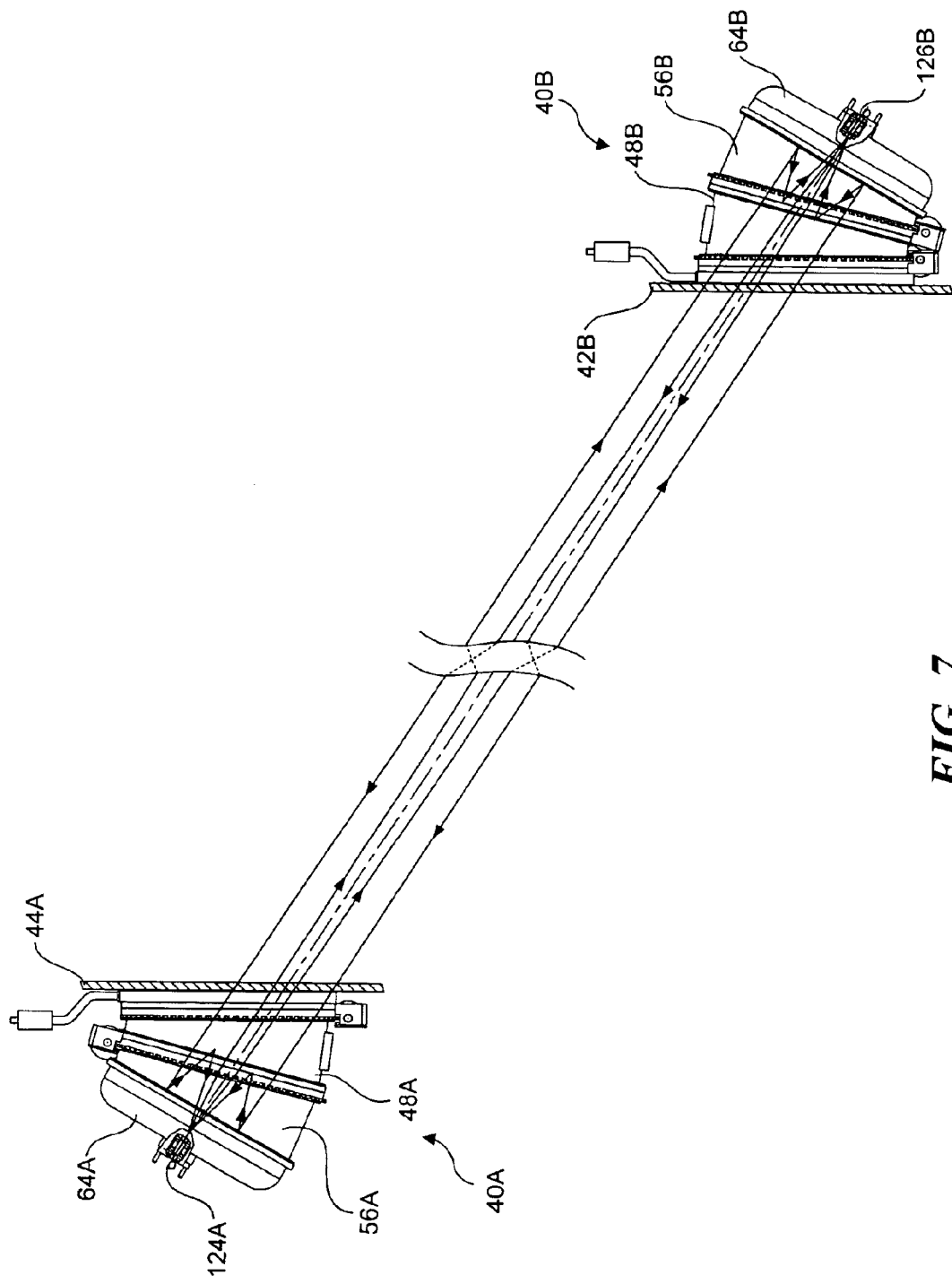
FIG. 7 illustrates a free space optical communications system that may be implemented through use of the present invention.

A system comprising a pair of window mounted positionable collectors 40A and 40B is shown in FIG. 7. In the system, window mounted positionable collector 40A is mounted to a window 44A in a first building "A," while window mounted positionable collector 40B is mounted to a window 44B in another building "B." In practice, a user at each window mounted positionable collector 40 would rotate inner and outer rotatable hollow wedge-cut members 48 and 56 until the optical axis of the transmitting optical components in each apparatus was aligned with the receiving optical components (i.e., the Cassegrain collector) of the other window mounted positionable collector. The users would then insert magnetic fluid-based fiber optic positioners 126 into their respective window mounted positionable collector. In addition to using magnetic fluid-based fiber optic positioners, conventional transceiver optics and electronics may also be used. In such instances, each transceiver would typically include a detector component located at the focal point of secondary reflectors 68. The transceivers also would produce an outgoing light beam that generally would be passed through lens 74 in a manner similar to that illustrated in FIG. 2B.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive. Furthermore, it is not intended that the scope of the invention in any way be limited by the above description, but instead be determined entirely by reference to the claims that follow.

What is claimed is:

1. An apparatus comprising:
a base adapted to be secured to a window;
a inner rotatable hollow wedge-cut member having a base end defining a inner base plane, operatively coupled to the base so as to enable rotation of the inner rotatable hollow wedge-cut member about the base, and having a top end defining a top plane that forms an acute angle with the base plane;
a outer rotatable hollow wedge-cut member having a base end defining a outer base plane, operative coupled to the top end of the inner rotatable hollow wedge-cut member so as to enable rotation of the outer rotatable hollow wedge-cut member about the top end of the inner rotatable hollow wedge-cut member; and
a support coupled to the outer rotatable hollow wedge-cut member, providing a mounting interface for an optical device such that when the optical device is mounted to the mounting interface an optical axis of the optical device is not perpendicular to the outer base plane,
wherein the optical axis of the optical device can be directed through the window along any angle within a cone of angulation by rotating the inner and outer rotatable hollow wedge-cut members to appropriate positions.

2. The apparatus of claim 1, further comprising:
a cover, mounted to the a top end of the outer rotatable hollow wedge-cut member;
a first sealing means for creating an air-tight seal between the base and the inner rotatable hollow wedge-cut member; and
a second sealing means for creating an air-tight seal between the inner rotatable hollow wedge-cut member and the outer rotatable hollow wedge-cut member,
wherein the window, base, inner and outer rotatable hollow edge-cut members and the cover form a sealed volume so as to enable the apparatus to be secured to the window by applying a vacuum to the sealed volume.

3. The apparatus of claim 2, wherein the cover further includes an air-tight optical aperture through which light can be pass, thereby enabling the optical device to be mounted outside of the sealed volume and receive and/or transmit light through the clear air-tight aperture.

4. The apparatus of claim 2, further comprising a gasket disposed between the base and the window.

5. The apparatus of claim 2, wherein the base end of the inner rotatable hollow wedge-cut member comprises a first annular flange and the inner sealing means comprises a first sealing ring disposed between the inner first flange and the base, and the top end of the inner rotatable hollow wedge-cut member and the base end of the outer rotatable hollow wedge-cut member respectively comprise second and third annular flanges, and the outer sealing means comprises a second sealing ring disposed between said outer and third annular flanges.

6. The apparatus of claim 5, wherein application of a vacuum to the sealed volume enables the base end of the inner rotatable hollow wedge-cut member to be operatively coupled to the base and the base end of the outer rotatable hollow wedge-cut member to be operatively coupled to the top end of the inner rotatable hollow wedge-cut member by causing a pressure differential between an atmospheric pressure condition on the outside of the sealed volume and the vacuum on the inside of the sealed volume, said pressure differential applying a first force between the inner annular flange and the base acting upon the first sealing ring and a second force between the second and third annular flanges acting on the second sealing ring.

7. The apparatus of claim 5, further comprising a lubricant disposed between the first sealing ring and the first annular flange and the base and between the second sealing ring and the second and third annular flanges.

8. The apparatus of claim 2, further comprising:
   a vacuum line having an input coupled to one of the components comprising the sealed volume and an output; and
   a check valve inline with the vacuum line that enables air to be expelled from the sealed volume when a vacuum is applied to the output of the vacuum line but prevents air from passing into the sealed volume when the output of the vacuum line is exposed to an atmospheric condition.

9. The apparatus of claim 2, further comprising a low-volume piezoelectric vacuum pump having an input operatively coupled to the sealed volume and an output exhausted to the atmosphere.

10. The apparatus of claim 1, wherein the base includes an inner annular flange and the base end of the inner rotatable hollow wedge-cut member comprises a outer annular flange, one of said inner and outer annular flanges having an overlapping tang that interlocks with the other annular flange, and the top end of the inner rotatable hollow wedge-cut member and the base end of the outer rotatable hollow wedge-cut member respectively comprise third and fourth annular flanges, one of said third and fourth annular flanges having an overlapping tang that interlocks with the other annular flange.

11. The apparatus of claim 1, further comprising:
   a first mechanical positioning means coupled between the base and the inner rotatable hollow wedge-cut member for rotating the inner rotatable hollow wedge-cut member relative to the base; and
   a second mechanical positioning means coupled between the inner rotatable hollow wedge-cut member and the outer rotatable hollow wedge-cut member for rotating the inner rotatable hollow wedge-cut member relative to the outer rotatable hollow wedge-cut member.

12. The apparatus of claim 11, wherein the first mechanical positioning means comprises a first gear box mounted to the base and a first ring gear coupled to the inner rotatable hollow wedge-cut member, and wherein the second mechanical positioning means comprises a second gear box mounted to the inner rotatable hollow wedge-cut member and a second ring gear coupled to the outer rotatable hollow wedge-cut member.

13. The apparatus of claim 1, wherein the optical device comprises a Cassegrain collector comprising:
   a primary reflector operatively coupled to the outer rotatable hollow wedge-cut member; and
   a secondary reflector operatively coupled to the primary reflector.

14. The apparatus of claim 13, wherein the primary reflector includes a central aperture through which light may pass through, further comprising a lens disposed within a central portion of the secondary reflector having an optical axis in alignment with an axis extending through the central aperture of the primary reflector.

15. A free space optical communications system comprising:
   a first optical transceiver mounted to a window in a first building;
   a second optical transceiver mounted to a window in a second building, each of said first and second optical transceivers comprising:
      a set of transceiver optics and electronics for transmitting and receiving an optical signal, and
      a multi-axis positioning mechanism mounted to the window and coupled to the set of transceiver optics and electronics for controlling an orientation of the set of transceiver optics and electronics such that outgoing optical signals emitting from each transceiver are directed toward the other transceiver so as to enable bi-directional communication between the first and second optical transceivers, wherein each of the multi-axis positioning mechanisms comprise:
      a base mounted to the window,
      an inner rotatable hollow wedge-cut member having a base end defining a inner base plane, operatively coupled to the base so as to enable rotation of the inner rotatable hollow wedge-cut member about the base, and having a top end defining a top plane that forms an acute angle with the base plane,
      an outer rotatable hollow wedge-cut member having a base end defining a outer base plane, operative coupled to the top end of the inner rotatable hollow wedge-cut member so as to enable rotation of the outer rotatable hollow wedge-cut member about the top end of the inner rotatable hollow wedge-cut member, and
      a support coupled to the outer rotatable hollow wedge-cut member, providing a mounting interface for an optical device corresponding to the transceiver optics and such that when the optical device is mounted to the mounting interface an optical axis of the optical device is not perpendicular to the outer base plane,
      wherein the optical axis of the optical device can be directed through the window along any angle within a cone of angulation by rotating the inner and outer rotatable hollow wedge-cut members to appropriate positions.

16. The free space optical communications system of claim 15, wherein the transceiver optics include a Cassegrain collector comprising a primary reflector that receives an incoming light signal and reflects the light signal toward a secondary reflector that in turn reflects the light toward a light detecting component.

17. The free space optical communications system of claim 15, wherein the set of transceiver optics and electronics comprises a magnetic fluid based fiber optic positioning apparatus that controls a position and orientation of an end portion of a fiber optic cable from which optical signals are emitted by controlling a magnetic field acting on a magnetic fluid in which the end portion of the fiber optic cable is disposed.

18. The free space optical communications system of claim 15, wherein each of the first and second transceivers is mounted to a respective window using a vacuum.

19. The free space optical communications system of claim 18, wherein the vacuum that is used to mount each of the first and second transceivers to their respective windows in maintained by a low-volume piezoelectric vacuum pump.

20. A free space optical communications system comprising:
   a first optical transceiver mounted to a window in a first building;

a second optical transceiver mounted to a window in a second building, each of said first and second optical transceivers comprising:

a set of transceiver optics and electronics for transmitting and receiving an optical signal, the set of transceiver optics and electronics comprising a magnetic fluid based fiber optic positioning apparatus that controls a position and orientation of an end portion of a fiber optic cable from which optical signals are emitted by controlling a magnetic field acting on a magnetic fluid in which the end portion of the fiber optic cable is disposed, and a multi-axis positioning mechanism mounted to the window and coupled to the set of transceiver optics and electronics for controlling an orientation of the set of transceiver optics and electronics such that outgoing optical signals emitting from each transceiver are directed toward the other transceiver so as to enable bi-directional communication between the first and second optical transceivers.

21. The free space optical communications system of claim 20, wherein each of the multi-axis positioning mechanisms comprise:

a base mounted to the window;

an inner rotatable hollow wedge-cut member having a base end defining a inner base plane, operatively coupled to the base so as to enable rotation of the inner rotatable hollow wedge-cut member about the base, and having a top end defining a top plane that forms an acute angle with the base plane;

an outer rotatable hollow wedge-cut member having a base end defining a outer base plane, operative coupled to the top end of the inner rotatable hollow wedge-cut member so as to enable rotation of the outer rotatable hollow wedge-cut member about the top end of the inner rotatable hollow wedge-cut member; and a support coupled to the outer rotatable hollow wedge-cut member, providing a mounting interface for an optical device corresponding to the transceiver optics and such that when the optical device is mounted to the mounting interface an optical axis of the optical device is not perpendicular to the outer base plane;

wherein the optical axis of the optical device can be directed through the window along any angle within a cone of angulation by rotating the inner and outer rotatable hollow wedge-cut members to appropriate positions.

22. The free space optical communications system of claim 20, wherein the transceiver optics include a Cassegrain collector comprising a primary reflector that receives an incoming light signal and reflects the light signal toward a secondary reflector that in turn reflects the light toward a light detecting component.

23. The free space optical communications system of claim 20, wherein each of the first and second transceivers is mounted to a respective window using a vacuum.

24. The free space optical communications system of claim 23, wherein the vacuum that is used to mount each of the first and second transceivers to their respective windows in maintained by a low-volume piezoelectric vacuum pump.

* * * * *